March 25, 1969
M. I. ROSENBERG ET AL
3,435,395
ROTARY ELECTROMAGNETIC ACTUATOR HAVING LINEAR RESPONSE CHARACTERISTICS
Filed Aug. 8, 1966
Sheet 1 of 2
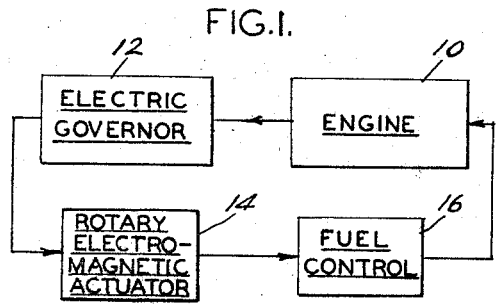
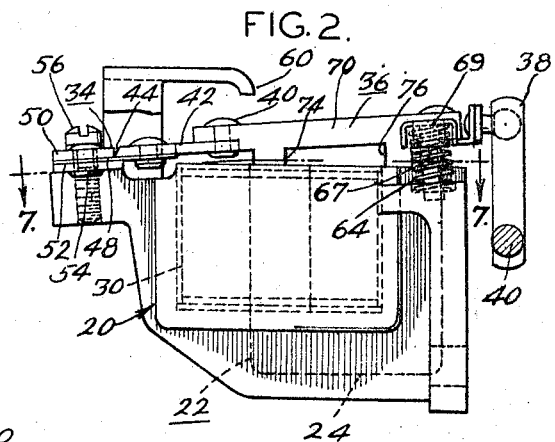
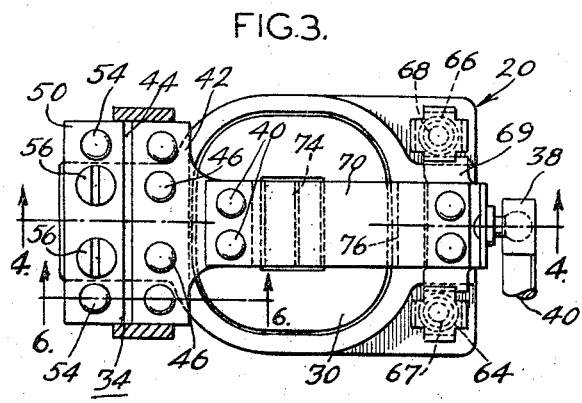
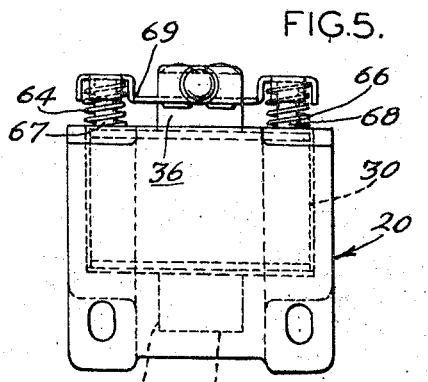
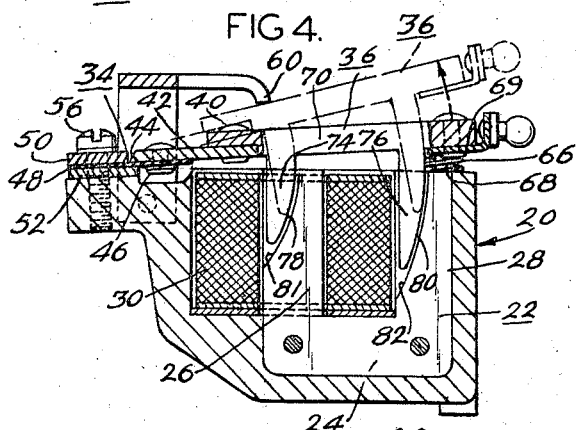
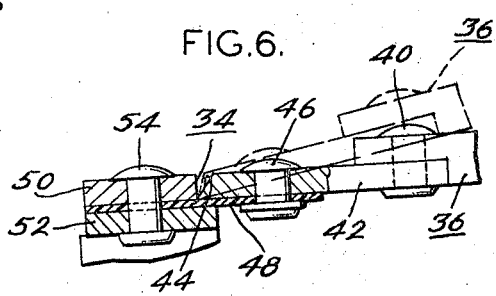
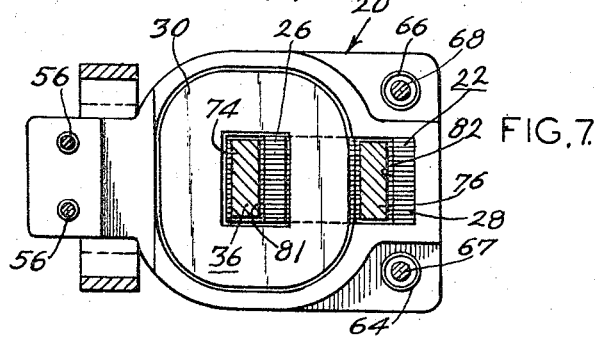
INVENTORS:
MERTON I. ROSENBERG
JOHN A. KIMBERLEY
BY Howson & Howson
ATTYS.

United States Patent Office 3,435,395
Patented Mar. 25, 1969

3,435,395
ROTARY ELECTROMAGNETIC ACTUATOR HAVING LINEAR RESPONSE CHARACTERISTICS
Merton I. Rosenberg, Springfield, Mass., and John A. Kimberley, Granby, Conn., assignors to American Bosch Arma Corporation, Garden City, N.Y., a corporation of New York
Filed Aug. 8, 1966, Ser. No. 570,802
Int. Cl. H01f 7/08, 3/00
U.S. Cl. 335—276     20 Claims

ABSTRACT OF THE DISCLOSURE

A rotary solenoid actuator combining high force capability with linear response characteristics, using a low-reluctance magnetic stator and a rotating magnetic armature having a curved surface coaxial with an adjacent curved surface of the stator and in partially overlapping relation thereto, the armature rotating about the axis of the two surfaces to change the extent of overlap. The non-fringing flux between the two curved surfaces exerts substantially only a radial force on the armature (i.e. no sideways force and no appreciable torque), and rotation of the armature is due to fringing flux between armature and stator, which flux is caused to remain substantially constant with changes in angle of the rotor for a given current to the actuator, over a wide range of angle of the armature.

---

This invention relates to rotary electromagnetic devices such as actuators which are responsive to electric current applied thereto to produce a rotary mechanical motion, and particularly to such actuators in which the current through a winding on a magnetic core is used to attract an armature toward the core, this attraction being opposed by a spring member in such manner that the rotational position of the armature is dependent upon the magnitude of the current supplied to the winding.

Electromagnetic actuators of the general class referred to above have found use in a variety of applications. The present invention will be described with particular reference to an electromagnetic actuator especially adapted for operating the fuel control in an engine speed governor system but it will be understood that it is in no way limited to such applications.

Electromagnetic actuators of the prior art, utilizing an electrical winding on a magnetic core to attract an armature against the force of a spring, commonly suffer from a number of disadvantages when used for such purposes. More particularly, such previously-known electromagnetic actuators have had characteristics such that the force exerted on the armature by a given electrical current differs markedly for different positions of the armature. For example, in many cases this force falls off with the square of the difference between armature and magnetic core. Also in such prior devices, the increment in force due to a given increment in current generally differs substantially for different positions of the armature. Largely as a result of these basic characteristics, prior devices have commonly required special springs of particular non-linear force-displacement characteristics for urging the armature away from the core, with resultant increase in cost and criticality. In addition, prior actuators generally have a relatively small useful working stroke, are capable of providing only relatively small forces at one end of their useful stroke, are relatively critical so far as providing reproducible operation is concerned, and in the case of rotary actuators are inclined also to be rather unreliable, at least after long periods of time, because of mechanical problems with the hinge arrangements employed.

Accordingly it is an object of the invention to provide a new and useful electromagnetic actuator.

Another object is to provide such an actuator of the rotary type which, over a predetermined range of operation, provides an attractive force on the armature thereof which is approximately constant for a given applied current even for substantially different positions of the armature with respect to the core while providing usefully different forces on the armature for different values of the applied current.

Another object is to provide such an actuator which has a relatively long useful working stroke.

A further object is to provide such an actuator which provides relatively high forces on the armature for a given current, throughout the useful working range.

Another object is to provide such an actuator which is relatively non-critical in construction and operation.

A further object is to provide such an actuator which operates reliably in cooperation with a spring for urging the armature away from the core, which spring may have substantially linear force-displacement characteristics.

Another object is to provide such an actuator having an improved hinge arrangement for rotatably mounting the armature with respect to the core.

In accordance with the invention there is provided a rotary actuator comprising a stator with energizing electrical winding thereon and a rotatable armature attracted toward the stator to an extent dependent upon the current through the winding, in which the rotational force or torque acting on the armature is approximately constant for any given current applied to said winding over a relatively large range of rotational positions of the armature but varies in the same sense as changes in the strength of the current applied to the winding. This is accomplished by employing a geometry of armature and stator which assures that those of the magnetic flux lines extending between stator and armature which produce substantial torque on the armature (i.e. those having substantial components normal to radii thereto from the axis of rotation of the armature) have an approximately constant density and a substantially fixed configuration with respect to their associated radii for a given current in the winding, over a substantial range of rotational motion of the armature.

More particularly, the stator is provided with an air gap therein, producing in effect a pair of spaced magnetic poles, and the armature is mounted adjacent these poles with its radial dimension partially bridging the gap so that the magnetic circuit through the stator is completed through the armature, i.e. so that the magnetic flux produced by the electrical winding extends in sequence through the stator, externally through the armature and back again to the stator.

The stator is provided with an arcuate surface substantially coaxial with the axis of rotation of the armature, and the armature is provided with an arcuate surface also coaxial with said axis and positioned so that it moves in overlapping closely-confronting relation to the arcuate surfac on the stator when the armature is rotated through a predetermined range, i.e., so that one end of said arcuate surface of said armature opposes said arcuate surface of said stator and one end of said arcuate surface of said stator opposes the arcuate surface of the armature over said range of armature rotation.

As a result of this relationship, the flux between armature and stator internal to the region of their overlap is substantially radial to the axis of rotation of the armature and therefore exerts only a radial force on the armature from which no substantial torque results. Accordingly changes in the sizes of the overlapping areas of the arcuate surfaces due to rotation of the armature do not materially affect the torque on the armature.

The torque which is exerted on the armature is, instead, due primarily to the flux produced adjacent the two overlapping edges of the two arcuate surfaces, i.e. the flux extending between the overlapping edge of the arcuate surface of the armature and the adjacent arcuate surface portion of the stator, and the flux between the overlapping edge of the arcuate surface of the stator and the adjacent arcuate surface of the armature. This flux, which may be designated edge flux or fringe flux, has substantial components normal to radii extending thereto from the axis of rotation of the armature and therefore exerts a torque on the armature urging the two arcuate surfaces toward a balanced, aligned position. Over a substantial range of overlap for which the arcuate surfaces are not in a balanced position, this edge or fringe flux stays substantially the same with respect to the edge producing it despite rotational motion of the armature and exerts substantially the same torque on the armature throughout that range. A change in current through the winding will then change the torque exerted on the armature, but for any given current the torque is approximately constant substantially regardless of the position of the armature within the operating range.

Preferably there are two such arcuate surfaces on the stator, one at each end of the gap in the stator, and two such arcuate surfaces on the armature spaced radially from each other, each arcuate surface on the armature being configured and positioned with respect to one of the arcuate surfaces on the stator in the manner described previously, so that the conditions and operations described above exist both for flux entering and for flux leaving the armature.

The actuator preferably also includes spring means acting on the armature in opposition to the torque exerted by the magnetic flux, so that in response to a given current the armature assumes a predetermined position for which the torque exerted on the armature by the magnetic flux is balanced by the opposing spring force. With the actuator of the invention, in which the torque on the armature due to the magnetic field is approximately constant for a given current, the exact nature of the force-displacement characteristic of the spring means is non-critical, and accurate and reliable operation can be obtained with common, reliable and inexpensive types of springs such as simple springs having linear force-displacement characteristics, as will be more apparent from the detailed description hereinafter.

In accordance with a further feature of the preferred form of the invention, the means for rotatably mounting the armature with respect to the core comprises a sheet of high tensile-strength flexible material, such as Fiberglas cloth coated with Teflon, the sheet being approximately secured at one end to the core and at the other to the armature. In the preferred embodiment, a knife-edge bearing is provided between a member fixed to the core and a knife-edge member secured to the armature at its radially-innermost end to oppose any tendency for compression of the flexible sheet.

These and other objects and features of the invention will be more readily comprehended from a consideration of the following detailed description taken in connection with the accompanying drawings, in which:

FIGURE 1 is a block diagram illustrating one principal application of the device of the invention;

FIGURE 2 is a side elevational view of a rotary actuator in accordance with the invention;

FIGURE 3 is a top view of the device shown in FIGURE 2;

FIGURE 4 is a sectional view taken along lines 4—4 of FIGURE 3;

FIGURE 5 is an end view of the device of FIGURE 2;

FIGURE 6 is a sectional view taken along lines 6—6 of FIGURE 3;

FIGURE 7 is a sectional view taken along lines 7—7 of FIGURE 2;

Figure 9:
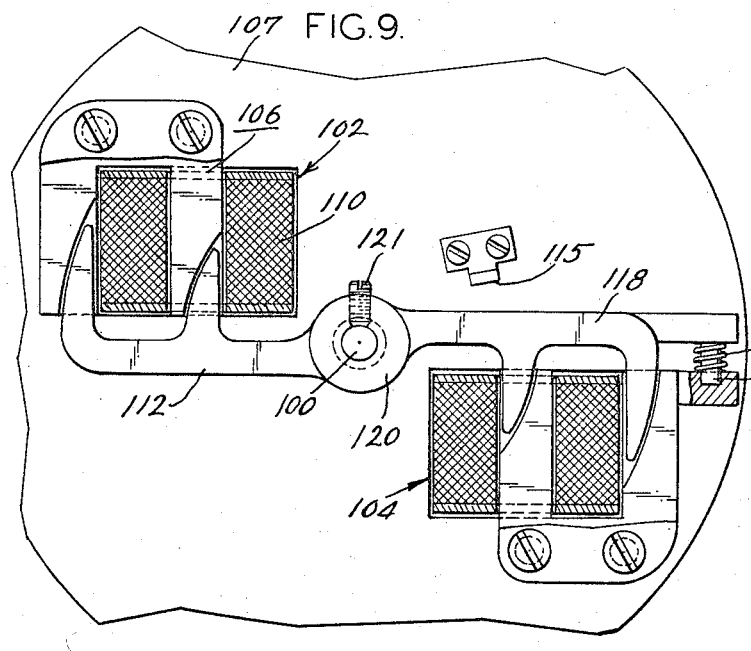
FIGURE 9 is a side elevational view of another embodiment of the invention employing a pair of cores and armatures arranged to apply a couple to a shaft.

FIGURE 1 illustrates one type of system in which the device of the invention is particularly useful and effective. In this system an engine 10 is connected to drive an electric governor 12 which produces an electrical output signal related to engine speed and supplies it to a rotary electromagnetic actuator 14. Electric governor 12, may, for example, be like that described and claimed in copending application Ser. No. 507,392 of Merton I. Rosenberg and Walter G. Bohaker, filed Nov. 12, 1965 and entitled Electric Governor System. The output signal of the electric governor is supplied to the control winding of rotary electromagnetic actuator 14, which responds thereto to produce a mechanical output motion for adjusting the position or setting of a fuel control 16 which in turn controls the rate of supply of fuel to the engine and hence the engine speed. The system operates as a closed servo loop to hold the engine speed substantially constant. In general, it is the function of the rotary electromagnetic actuator 14 to produce a mechanical output motion for setting fuel control 16 to a definite predetermined position for any given intensity of the current supplied to actuator 14. As will be described in more detail hereinafter, this is accomplished generally by utilizing in the actuator a rotatable armature which is attracted in a first direction with a force which increases with the intensity of the control signal applied to the actuator, against the force of a spring arrangement, the armature position for any given input current then being determined by a balance between the forces exerted on the armature in one direction by the spring and in the other direction by the magnetic attraction of the actuator.

Referring now to the preferred embodiment of the rotary electromagnetic actuator of the invention illustrated in FIGURES 2–7, the device comprises a housing 20 of a non-magnetic material such as aluminum, in which is seated a generally U-shaped magnetic core 22 having a base portion 24 and a pair of upstanding legs 26 and 28. The core may conveniently be made up of a stack of U-shaped motor laminations. A single continuous electrical coil 30 is positioned around leg 26 so that, when a direct current is passed through the coil, a magnetic flux is produced which extends serially through leg portion 26, base portion 24 and leg 28 of the U-shaped core and thence externally between the tops of legs 26 and 28.

Mounted above the top ends of legs 26 and 28 by means of a hinge arrangement 34 is a rotatable armature 36 of magnetic material such as iron. In FIGURES 4 and 6 the armature 36 is shown in full line in its downward position, and in broken line in its upper position. The outer end of armature 36 is provided with a ball and socket connection 38 to a control link 40, which may extend to the fuel control 16 which is to be adjusted by the actuator, for example to the butterfly of a carburetor.

As shown particularly clearly in FIGURES 4 and 6, the end of armature 36 nearest its axis of rotation is secured as by rivets 40 to a metal knife-edge member 42 which extends in the same direction as the armature 36 and has a horizontally-extending knife edge 44 extending at right angles to the length of the armature. The knife-edge member 42 is secured, as by means of rivets 46, to a flexible sheet 48 which may be of Fiberglas coated with polytetrafluoroethylene, commercially available under the name Teflon, the other end of flexible sheet 48 being clamped to housing 20 by means of a pair of face plates 50 and 52 disposed on opposite sides of the flexible sheet member 48, the plate members being held together by appropriate rivets such as 54 and by means of screws such as 56 which also secure the armature assembly to the housing 20. The knife edge 44 is positioned to bear against the adjacent side of the upper face plate 50, thereby providing a low-friction, knife-edge bearing contact which permits easy rotation of armature 36 but prevents compression or buckling of the flexible sheet 48.

A stop member 60 mounted on housing 20 is positioned above armature 36 so as to limit upward rotation of the armature and a pair of coil springs 64 and 66 are mounted on housing 20 near the outer end of armature 36. A pair of rods 67 and 68 secured to the top of housing 20 and projecting upwardly therefrom serve to locate springs 64 and 66, respectively, which are placed over them; the portion of rods 67 and 68 extending above the housing is shorter than the springs when the armature is in its uppermost position, and serve as stops to limit the downward motion of the armature. A cross member 69 secured to armature 36 near its outer end passes transversely over, and retains, the tops of the springs 64 and 66 to transmit the upward spring force to the armature. The springs 64 and 66 therefore urge the armature 36 upward and away from the core 22, while current through coil 30 produces a magnetic field between the tops of legs 26 and 28 which acts on armature 36 to pull it downwardly toward the core against the springs 64 and 66. When the spring-retaining portions of cross member 69 abut against the rods 67 and 68, the armature is arrested in its lowest position.

Armature 36, which as described above is adapted to rotate about an axis through and along knife edge 44, has a portion 70 extending radially from its axis of rotation and a pair of projections 74 and 76 extending downwardly and substantially at right angles to radial armature portion 70. The transverse projections 74 and 76 are provided with arcuate surface portions 78 and 80, respectively, which are substantially coaxial with the axis of rotation of armature 36, and the legs 26 and 28 of magnetic core 22 are provided with arcuate portions 81 and 82, respectively, which are also substantially coaxial with the axis of rotation of armature 36. In the present example all four of the latter arcuate surfaces are substantially cylindrical surfaces. The transverse armature projections 74 and 76 are so positioned that as armature 36 rotates the arcuate surface portions 78 and 80 pass in closely-confronting, substantially parallel, uniformly-spaced relation to arcuate surfaces 81 and 82 of magnetic core 22, so that the gap between the arcuate surface of each transverse armature projection and its associated magnetic core leg remains substantially constant during such rotation of the armature.

Before the system is put into operation, the springs 64 and 66 hold the rotatable armature 36 in its uppermost position against stop member 60. When the engine is started and the electric governor system actuated, a large initial current is supplied to coil 30 by the electrical circuitry in the governor to attract rotatable armature 36 downward toward magnetic core 22 against the force of springs 64 and 66. As armature 36 moves downward, the resultant motion of control link 40 causes the fuel control 16 to move in the direction to speed up the engine 10. As the engine speeds up, downward motion of armature 36 is increasingly opposed by the force of springs 64 and 66, and electric governor 12 also responds to the engine speedup to reduce the current applied to winding 30. As a result of the closed loop servo arrangement illustrated in FIGURE 1, the armature 36 therefore automatically assumes positions such as to maintain the engine speed substantially constant.

Figure 8:
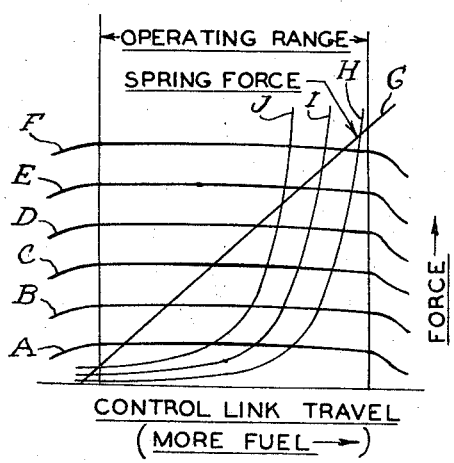
FIGURE 8 is a graphical representation showing certain characteristics of the device of the invention.

The type of characteristics presented by the actuator of the invention which enhance the operation of such a servo control system are illustrated in FIGURE 8, in which ordinates represent force and abscissae represent the travel of control link 40, the curves thereof being illustrative and not necessarily exactly to scale. The solid curves A, B, C, D, E and F show the force exerted on armature 36 by the magnetic attraction of core 22 for different fixed, progressively larger, control currents through winding 30, the current increments between successive curves being approximately equal. Straight line G represents the force exerted by the springs 64 and 66 for different positions of the control link, while broken line curves H, I and J illustrate the force versus control link travel characteristics of one class of prior art device for control currents equal respectively to those which produce curves A, B and C.

As can be seen from FIGURE 8, each of the characteristic curves A through F of the device of the invention has a substantially flat portion of relatively wide extent, within which the magnetic force exerted on the armature is substantially constant for a given control current throughout a wide range of control link travel. This flat region of the curves defines the operating range of control link travel corresponding to the operating range of angle of rotation of armature 36, the stop member 60 and the cross piece 69 preferably being disposed to limit the angle of rotation of the armature to this range. The spring force curve G is shown for a simple spring having a linear force-displacement characteristic. The slope of the spring force curve depends upon the strength of the spring, being greater for stronger springs. The spring force curve G is selected so that it intersects the actuator characteristics A–F in their substantially flat portions. For any given control current, including those producing characteristics between the curves A–F, the control link will assume a position equal to the abscissa of the point at which the spring force curve G crosses the corresponding actuator characteristic curve.

In contrast, the prior-art actuator characteristics H, I and J are strongly-curved, divergent, and distinctly not flat, except for a tendency toward flatness in the region at the extreme left-hand end of the curve where the force on the armature is extremely small.

The significance of the difference between the characteristics of the prior-art actuator and the actuators of the invention will be appreciated from the following. The spring force curve G cuts all of the characteristic curves A–F at a relatively large angle. This results in highly stable and relatively non-critical operation of the servo loop of FIGURE 1. In contrast, there is no equally satisfactory position for the linear-spring force curve with respect to the characteristic curves H, I, J. For example, if the spring force curve is located at the extreme left of characteristic curves H, I, J very little force is available from the actuator; if the spring force curve is positioned further to the right to intersect the characteristic curves H, I, J at higher force values, it will in general intersect them at relatively small angles, or may be tangent to the characteristics, or may intersect them at two points or not at all. In any of these cases the reliability and stability of the servo loop is adversely affected. Even if a special spring having a curved force-displacement characteristic is utilized in an attempt to obtain large angles of intersection with curved actuator characteristics such as H, I, J, it is generally found that as a practical matter this can be accomplished only over a relatively small range of control link travel, for example over less than half the operating range of the device of the invention, and in general the actuator forces available are relatively small.

It will therefore be appreciated that the characteristics of the actuator of the invention provide relatively large actuator forces, a relatively larger operating range of control link travel, and stable, non-critical operating characteristics for a servo loop, even while utilizing a simple linear spring of small expense and long life.

For best results the gap between the armature projections 74, 76 and core legs 26, 28 is preferably made as small as practical, for example about 0.010 inch. Adjustment of the armature position for this purpose may be accomplished by making the clearance holes for screws 56 somewhat larger than the screw diameter, adjusting the armature to provide the desired gap, and then tightening the screws.

The hinge arrangement described above provides for free rotation over long periods of time without servicing requirements, and thus assures that resistance to rotation by the hinge arrangement will not modify, or interfere with obtaining, the desired operating characteristics.

As illustrated in FIGURE 9, a plurality of actuator devices each similar in basic respects to that previously described may be coupled together to act jointly upon a common mechanical output member. For example, in FIGURE 9 the shaft 100 represents the output shaft which is to be turned by a pair of actuator devices 102 and 104. Actuator device 102 comprises a U-shaped magnetic core 106 attached to a supporting frame 107, an electrical winding 110 around one leg of core 106, and an armature 112 similar to that described in connection with previous figures except that, instead of being hinged, it is secured to output shaft 100 for rotation with shaft 100 about its axis. A spring 113 and stops 114 and 115 are also preferably employed. Actuator device 104 may be identical with actuator device 102, its armature 118 also being secured to output shaft 100 for rotation about the axis thereof. In the example shown, the armature 112 and 118 are combined in a single piece integral with each other and with a boss 120 surrounding shaft 100, a set screw 121 being provided to secure the integral double armature to the shaft 100. The cores of the two actuator elements 102 and 104 are disposed on the sides of their respective armatures such that currents through the two coils thereof produce additive rotational forces on the armature and thus serve as a couple for rotating output shaft 100. More than two actuator elements may also be combined to act on a single output element by modifications which will occur to one skilled in the art.

Figure 10:
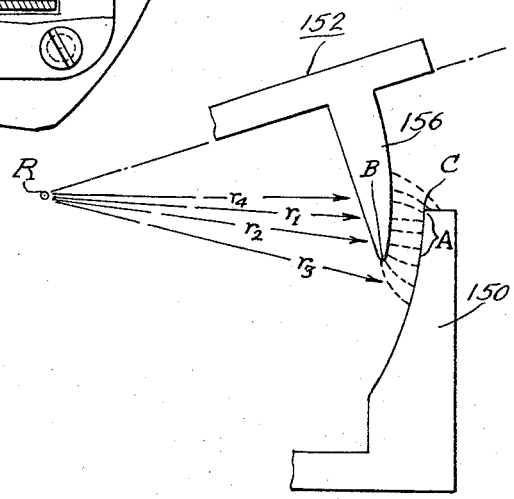
FIGURES 10 and 11 are diagrammatic representations to which reference will be made in explaining the operation of the actuator.
Figure 11:
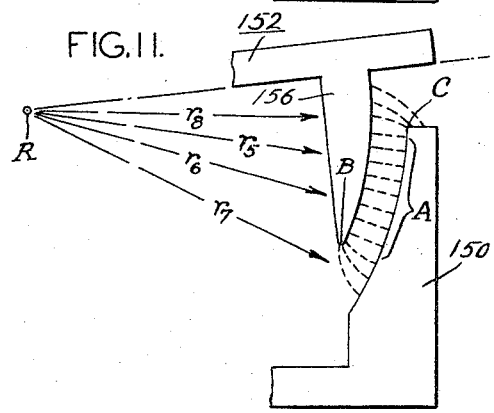

Referring now to FIGURES 10 and 11, which represent diagrammatically a portion of the actuator of the invention in two different position of its armature, the stator is designated 150, the armature as 152, and the radially-outer armature projection as 156. In both figures the spacing between stator and armature projection is greatly exaggerated. FIGURE 10 shows the armature in its upward position in which the arcuate surface of armature projection 156 overlaps only slightly the corresponding arcuate surface of stator 150. In this position, the lower edge B of armature projection 156 confronts or opposes the arcuate surface of the stator, and the upper end C of the arcuate surface of the stator confronts or opposes the arcuate surface of the armature projection 156. Between B and C there is a region of overlap A in which the armature projection 156 and the stator 150 are substantially uniformly spaced from each other and in which the magnetic flux lines, shown as dashed lines, extend generally along radii, such as $r_1$ and $r_2$ for example, from the armature axis of rotation R. However at the lower edge B of this region of overlap, the flux lines extend transversely to the local radii such as $r_3$; accordingly the latter edge-flux lines produce a torque on armature 156 urging it downward in the figure. Similarly, at the upper edge of the region of overlap, as at C, the flux lines adjacent but outside the region of overlap extend transverse to the local radii such as $r_4$ and also exert a torque an armature 152 urging it downward.

Referring now to FIGURE 11, in which elements corresponding to those in FIGURE 10 are indicated by corresponding numerals, the armature 152 is shown in a lower position. In this case the region of overlap A is substantially larger, but the flux lines in this region again extend substantially along the local radii such as $r_5$, $r_6$. Accordingly these flux lines exert no substantial torque on armature 152. Again, however, the flux lines adjacent the lower end B of armature projection 156 contain substantial non-radial components, and in fact the directions of the latter flux lines with respect to local radii such as $r_7$ are substantially the same as the directions of the corresponding flux lines in FIGURE 10 with respect to the local radii such as $r_3$. Also, the flux lines adjacent the upper end C of stator 150 have substantial nonradial components and in fact have directions bearing substantially the same relation to the local radii such as $r_8$ as do the flux lines adjacent C in FIGURE 10 to the corresponding local radii such as $r_1$.

It will therefore be appreciated that the geometry is such that the flux lines having substantially non-radial components, which are the only ones producing substantial torque an armature 152, are substantially the same with respect to the local radii for the two different positions of the armature shown in FIGURES 10 and 11, and accordingly the torque on the armature is approximately the same for these two positions and for all intermediate positions. The parallel nature of the two arcuate surfaces assures that the strength of the magnetic field in these regions, for a given current, also remains substantially constant. The closeness of the spacing of the two arcuate surfaces assures that the magnetic force exerted on the armature is adequately large, and further assured that the above-indicated edge or fringe flux is large compared with any stray leakage flux which may exist in the system.

In some embodiments of the invention a greater or lesser number of arcuate surface portions may be provided on the armature and core than are shown in the drawings, and other shapes and forms of the core may be used.

Thus while the invention has been described in detail with particular reference to specific embodiments thereof, it may be embodied in any of a variety of forms differing from those specifically described and claimed without departing from the spirit and scope of the invention as defined by the appended claims.

What is claimed is:
1. A rotary electromagnetic device, comprising:
   a low-reluctance stator of magnetic material having an electrical winding thereon and having a pair of magnetic pole regions of opposite magnetic polarity spaced from each other by a gap, whereby the magnetic flux extending through said stator and externally between said pole regions is variable in response to changes in current through said winding; and
   an armature of magnetic material rotatable about an axis and positioned so that magnetic flux extending between said pole regions passes through said armature and exerts a torque on said armature about said axis to urge it toward said stator;
   at least one of said pole regions having an arcuate surface substantially coaxial with said axis, and said armature having at least one arcuate surface substantially coaxial with said axis and partially overlapping said at least one arcuate surface of said pole region so that the extent of said overlapping changes with rotation of said armature about said axis throughout a predetermined angular range, the overlapping portions of said arcuate surfaces being in closely-spaced confronting relation to each other to provide a relatively low-reluctance gap between them for magnetic flux;
   the configuration of said stator and of said armature being such that, for a given current through said winding, substantially all of the non-fringing magnetic flux between said overlapping portions of said closely-spaced arcuate surfaces extends substantially radially of said axis and the fringing magnetic flux at the extremes of said overlapping portions which produces rotation of said armature about said axis remains substantially uniform with respect to said armature over said angular range, whereby the torque exerted on said armature about said axis remains substantially constant with rotation of said armature through said angular range.
2. The device of claim 1, comprising means for resisting said urging of said armature toward said stator.

3. The device of claim 2, in which said resisting means comprises spring means urging said armature away from said stator.

4. The device of claim 1, in which said armature comprises an arm portion extending generally radially of said axis and a projection thereon extending generally normal to said arm portion, said arcuate surface of said armature being disposed on said projection.

5. The device of claim 1, in which both of said pole regions have arcuate surfaces coaxial with said axis, and in which said at least one arcuate surface of said armature comprise two arcuate surfaces displaced from each other radially of said axis, each of said arcuate surfaces of said pole regions being coaxial with said axis and disposed in overlapping, closely-spaced confronting relation to a different one of said arcuate surfaces of said stator.

6. The device of claim 1, comprising means for limiting rotation of said armature to said predetermined angular range.

7. A rotary electromagnetic actuator, comprising:
a low-reluctance magnetic core, said core having an arcuate surface portion coaxial about a predetermined axis;
an armature of magnetic material mounted for rotation about said axis of said arcuate surface portion of said core, said armature having an arcuate surface portion thereon which is coaxial with said axis and which is rotatably positionable in parallel partially-overlapping, closely-confronting spaced relation to said surface portion of said core to provide a substantially constant gap between said armature surface portion and said core surface portion as said armature is rotated through a substantial arc with respect to said core, the extent of said overlapping changing with rotation of said armature;
an electrical winding on said core for producing a magnetic field through said core and said armature to attract said armature toward said core; and
spring means for opposing said attraction of said armature toward said core;
the configuration of said core and of said armature being such that, for a given current through said winding, substantially all of the non-firing magnetic flux between the overlapping parts of said arcuate surface portions extends substantially radially of said axis and the fringing magnetic flux at the extremes of said overlapping parts which produces rotation of said armature about said axis remains substantially uniform with respect to said armature as said armature is rotated through said arc, whereby the torque exerted on said armature about said axis remains substantially constant with rotation of said armature through said axis.

8. The actuator of claim 7, in which said armature comprises an arm extending radially from said axis of rotation and a projection extending generally normal to said arm, said projection having thereon said arcuate surface portion of said armature.

9. The actuator of claim 7, in which said core and said armature are shaped to provide one magnetic pole at said core surface portion and an opposite magnetic pole in said core adjacent a portion of said armature which is farther from said armature surface portion than is said one magnetic pole.

10. The actuator of claim 7, comprising means for limiting rotation of said armature to a range for which said armature surface portion and said core surface portion partially overlap.

11. The actuator of claim 7, in which said means for mounting said armature comprises a flexible sheet secured with respect to said core at said axis of rotation, said armature being fastened to said sheet.

12. The actuator of claim 11, comprising a knife-edge member secured to the radially-inward end of said armature and having a knife edge extending along said axis, and a bearing member fixed with respect to said core against which said knife edge bears.

13. A rotary electromagnetic actuator, comprising:
an armature of magnetic material;
a low-reluctance magnetic core having an electrical winding thereon and having a pair of spaced-apart pole regions adjacent one side of said armature, said winding being responsive to electrical current therethrough to produce opposite magnetic poles in said pole regions; and
means mounting said armature for rotation in the magnetic field between said pole regions, about a predetermined axis with respect to said core;
said armature having an arcuate surface portion substantially coaxial with said axis, said core having an arcuate surface portion substantially coaxial with said axis;
said mounting means positioning said armature so that said arcuate surface portion of said armature moves in closely-confronting, partially-overlapping substantially parallel relation to said arcuate surface portion of said core to maintain a substantially constant gap between said closely-confronting arcuate surface portions, the degree of said overlap varying with rotation of said armature;
the configuration of said core and of said armature being such that, for a given current through said winding, substantially all of the non-fringing magnetic flux between the overlapping parts of said arcuate surface portions extends substantially radially of said axis and the fringing magnetic flux at the extremes of said overlapping parts which produces rotation of said armature about said axis remains substantially uniform with respect to said armature as said armature is rotated, whereby the torque exerted on said armature about said axis remains substantially constant with rotation of said armature about said axis.

14. A rotary electromagnetic actuator, comprising:
a supporting housing;
a generally U-shaped low-reluctance magnetic core secured to said housing and having a pair of spaced-apart leg portions and an interconnecting base portion;
an electrical winding about one of said legs responsive to an electrical current therethrough to produce magnetic flux extending successively through said one leg, said base portion, the other of said pair of legs, and from said other leg externally of said core to said one leg; and
an armature of magnetic material mounted for rotation in said magnetic field above said pair of legs, toward and away from said core and about an axis external of said core, said axis being substantially perpendicular to a line joining said legs of said pair;
said armature having a portion extending radially of said axis and over both of said legs and having a pair of projections transverse to said radially-extending portion, said projections each having a cylindrical surface coaxial with said axis;
said legs each having a cylindrical surface portion on the side of said leg toward said axis which is coaxial with said axis;
said cylindrical surface portions of said transverse projections and of said legs being positioned so that said surface portion of each of said projections passes in closely-confronting, substantially uniformly-spaced partially overlapping relation to a different one of said surface portions of said legs the extent of said overlap varying as said armature is rotated through a predetermined range;
the configuration of said core and of said armature being such that, for a given current through said winding, substantially all of the non-fringing magnetic flux between the overlapping parts of said cylindrical surface portions extends substantially radially of said axis and the fringing magnetic flux at the extremes of said overlapping parts remains substantially uniform with respect to said armature as said armature is rotated through said range, whereby the torque exerted on said armature about said axis remains substantially constant with rotation of said armature through said range.

15. The device of claim 14, comprising also spring means for urging said armature away from said core.

16. The device of claim 15, in which said spring means have a substantially linear force-displacement characteristic within said range of armature rotation.

17. The device of claim 14, comprising stop means for limiting rotation of said armature to said predetermined range.

18. A rotatable armature structure for a rotary actuator, comprising:
- an armature;
- a flexible sheet secured at one end to one end of said armature;
- a supporting structure;
- means securing the other end of said sheet to said supporting structure to permit rotation of said armature about an axis fixed with respect to said supporting structure;
- a knife-edge member securing said armature to said sheet and having a knife-edge extending substantially along said axis; and
- means secured to said supporting structure and making line contact with said knife-edge to provide a bearing surface for rotation of said knife-edge thereon.

19. A rotary electromagnetic actuator, comprising:
- a generally U-shaped low-reluctance core of magnetic material having spaced apart leg portions;
- an electrical winding on said core for producing magnetic flux extending in a serial path through said core and between said legs externally of said core;
- an armature of magnetic material disposed in said field external of said core;
- means mounting said armature for rotation about a predetermined axis with respect to said core, whereby current through said winding causes said armature to be urged rotationally toward said core with a force which increases with the strength of said current;
- spring means urging said armature away from said core;
- said armature having an arcuate surface portion substantially coaxial with said predetermined axis, one of said legs having an arcuate surface portion substantially coaxial with said predetermined axis;
- said armature surface portion being positioned to rotate adjacent and in substantially parallel, partially-overlapping, confronting relationship to said surface portion of said one leg, with a varying extent of overlap as said armature rotates about said predetermined axis within a predetermined range of said rotation; and
- means for limiting rotation of said armature about said axis to substantially said predetermined range;
- the configuration of said core and of said armature being such that, for a given current through said winding, substantially all of the non-fringing magnetic flux between the overlapping parts of said arcuate surface portions extends substantially radially of said axis and the fringing magnetic flux at the extremes of said overlapping parts which produces rotation of said armature about said axis remains substantially uniform with respect to said armature as said armature is rotated through said arc, whereby the torque exerted on said armature about said axis remains substantially constant with rotation of said armature through said arc.

20. A rotary electromagnetic actuator, comprising:
- a generally U-shaped low-reluctance core of magnetic material having a first leg and a second leg, said legs being spaced apart and generally parallel to each other;
- an electrical coil around said core leg for producing magnetic flux extending in a serial path through said core including said first and second legs and between the free ends of said legs external of said core;
- an armature of magnetic material in said field external of said core and extending over and between said ends of said legs;
- means mounting said armature for rotating about a predetermined axis external to the region between the outer edges of said legs, said axis being substantially normal to a line through said ends of said legs, whereby current through said coil causes said armature to be urged rotationally toward a position adjacent said ends of said legs;
- spring means having substantially linear force-displacement characteristics for urging said armature rotationally away from said ends of said legs of said core;
- said armature having a first portion extending substantially radially of said axis and having first and second radially-spaced portions extending transversely to said first radially-extending portion;
- each of said radially-extending armature portions having a substantially cylindrical surface which is substantially coaxial with said axis;
- each of said legs having a substantially cylindrical surface which is substantially coaxial with said axis;
- each of said surfaces of said radially-extending armature portions being positioned to rotate adjacent and in substantially parallel confronting, partially overlapping relationship to a different one of said surfaces of said leg portions as said armature rotates about said axis within a predetermined angular range of rotation; and
- means for limiting rotation of said armature about said axis to substantially said predetermined range;
- the extent of said overlapping varying with rotation of said armature, the configuration of said core and of said armature being such that, for a given current through said winding, substantially all of the non-fringing magnetic flux between the overlapping parts of said cylindrical surface portions extends substantially radially of said axis and the fringing magnetic flux at the extremes of said overlapping parts remains substantially uniform with respect to said armature as said armature is rotated through said range, whereby the torque exerted on said armature about said axis remains substantially constant with rotation of said armature through said range.

References Cited

UNITED STATES PATENTS

| | | | |
|---|---|---|---|
| 454,476 | 6/1891 | Hering | 335—279 XR |
| 2,679,563 | 5/1954 | Katsumata | 335—271 XR |
| 3,259,812 | 7/1966 | O'Neil | 335—270 XR |
| 3,278,875 | 10/1966 | McDonald | 335—272 |
| 3,325,660 | 6/1967 | Boyer. | |

GEORGE HARRIS, Primary Examiner.

U.S. Cl. X.R.

335—279

UNITED STATES PATENT OFFICE
CERTIFICATE OF CORRECTION

Patent No. 3,435,395　　　　　　　　　　　　　　　　　　March 25, 1969

Merton I. Rosenberg et al.

It is certified that error appears in the above identified patent and that said Letters Patent are hereby corrected as shown below:

Column 6, line 70, "practiral" should read -- practical --. Column 7, line 36, "position" should read -- positions --. Column 8, line 10, "an" should read -- on --. Column 9, line 44, "non-firing" should read -- non-fringing --.

Signed and sealed this 14th day of April 1970.

(SEAL)
Attest:

Edward M. Fletcher, Jr.　　　　　　　　　　　WILLIAM E. SCHUYLER, JR.
Attesting Officer　　　　　　　　　　　　　　　　Commissioner of Patents